United States Patent [19]
Hennenfent et al.

[11] 3,982,318
[45] Sept. 28, 1976

[54] MAGNETIC TRANSDUCER HEAD CORE MANUFACTURING METHOD

[75] Inventors: Douglas Joseph Hennenfent, Minneapolis; Allan Lawrence Holmstrand, Bloomington, both of Minn.

[73] Assignee: Control Data Corporation, Minneapolis, Minn.

[22] Filed: Jan. 29, 1976

[21] Appl. No.: 653,578

[52] U.S. Cl. ............................... 29/603; 360/119
[51] Int. Cl.² ........................................ G11B 5/22
[58] Field of Search .............. 29/558, 603; 360/119, 360/120, 121, 127

[56] References Cited
UNITED STATES PATENTS
3,810,245   5/1974   Ozawa et al. ........................ 29/603

*Primary Examiner*—Robert Louis Spruill
*Attorney, Agent, or Firm*—Edward L. Schwarz

[57] ABSTRACT

A method for manufacturing a magnetic core for use in data transducing, characterized by having the depth of the shallower flux gap face precisely equal to a predetermined value. The method involves machining a notch in the flux gap face of one element at a precise distance from a reference surface before bonding of the two elements of the core together. The transducing surface can then be machined after assembly to an exact distance from the reference surface to automatically determine the desired flux gap depth.

8 Claims, 3 Drawing Figures

MAGNETIC TRANSDUCER HEAD CORE MANUFACTURING METHOD

BACKGROUND OF THE INVENTION

1. Field of the Invention

Moving medium magnetic recording devices universally employ a wound magnetic core having a flux gap in the flux path to write and read data in the medium. In the high density devices employed today it is important that the reluctance of the flux gap and of the flux path in general be precisely controlled to provide maximum accuracy in performing the data transducing operations. It is further desirable to reduce the reluctance of the remainder of the flux path as much as possible for increased readback voltage and lower writing current. Complicating all these problems is the fact that the high data densities common today require extremely small dimensions of the core flux gap and hence at least one of the elements from which the core is formed must have these very small dimensions. In a design in popular use today, a relatively large "I" element is bonded to a relatively small "C" element to form the flux gap and flux path. Because the relatively small C element defines these flux gap dimensions, control of flux gap depth within desired limits has been difficult.

2. Description of the Prior Art

Prior techniques have all involved formation of the C element with the desired flux gap depth and then correctly positioning it on the face of the I element. The depth of the C element then forms the smaller depth dimension of the flux gap. A variation on this technique involves initially forming the C element with the flux gap depth dimension greater than desired, and bonding the C element to the I element with less accurate placement than required by the aforementioned technique, and then machining the transducing surface formed by the I and C elements until the C element flux gap face depth equals that desired for the less deep flux gap face. This is also not preferred because the relative smallness of the C element makes creation and use of a reference surface on it quite difficult. This latter method is shown by U.S. Pat. Nos. 3,402,463 (Bos et al.) and 3,395,451 (Peloschek). Other patents directed toward producing magnetic heads having exactly dimensioned gap depths are U.S. Pat. Nos. 3,094,772 and 3,302,268 (both Duinker) and 3,435,155 and 3,531,859 (both Van Der Voo). U.S. Pat. No. 3,550,264 (Bouwma) discloses a method which employs a mandrel or dowel inserted in the core aperture to provide a reference surface for measuring gap depth. All the techniques described in these patents are relatively straight forward and direct. But when dealing with extremely small gap depths they are difficult to employ and are not sufficiently accurate.

BRIEF DESCRIPTION OF THE INVENTION

In this invention, use is made of the fact that the I element is relatively large compared to the C element. A reference surface is machined onto the I element blank approximately parallel to the face which will eventually form a portion of the transducing surface, before the C element is bonded to the I element. Again prior to bonding of the elements, a notch is machined into the I element surface which will, after assembly define one side of the flux gap, the line of intersection of the notch with the flux gap face nearest the transducing surface being spaced therefrom a distance at least equal to the desired gap height, and a predetermined distance from the reference surface. The depth of the notch should be several times that of the flux gap length (length being measured perpendicular to the flux gap face, i.e., parallel to the transducing surface) so as to avoid magnetic leakage between the faces, and shallow enough to avoid affecting the reluctance characteristics of the I element. The width of the notch can be any convenient value, but should be great enough to allow the inner edge of the C element flux gap face to fall within the notch edges without the necessity of precise and expensive placement.

The C element is designed with a flux gas face height greater than the desired height of the minimum gap face height. After the preceding described operations on the I element, the C element is bonded to it with the flux gap faces opposing each other and the inner edge of the C element flux gap face falling within the edges of the notch. Then, the transducing surface of the now-assembled core is machined until the distance between the transducing surface and the reference surface precisely equals the desired flux gap height plus the aforementioned predetermined distance between the notch edge and the reference surface. Because the effect of gap depth on gap reluctance is almost totally dependent on the depth of the less deep flux gap face, it is immaterial which flux gap face depth is precisely determined, so long as the other is greater. This invention provides an inexpensive yet accurate way to control this smaller depth.

Accordingly, one purpose of this invention is to allow more accurate control of flux gap reluctance. Another purpose of this invention is to increase the accuracy of the flux gap face depth and reduce the number of these cores rejected for being out of tolerance.

Still another purpose of this invention is to reduce the expense and time required to manufacture each individual core.

DESCRIPTION OF THE PREFERRED EMBODIMENTS

Figure 1:
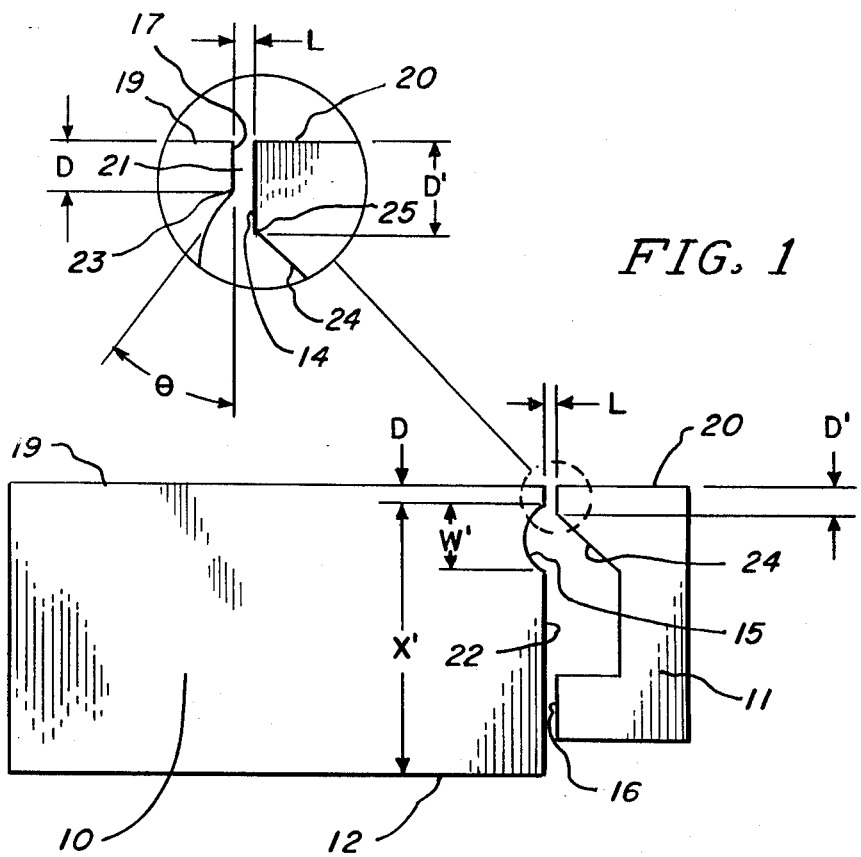
FIG. 1 is a projective side view of an assembled core.
Figure 3:
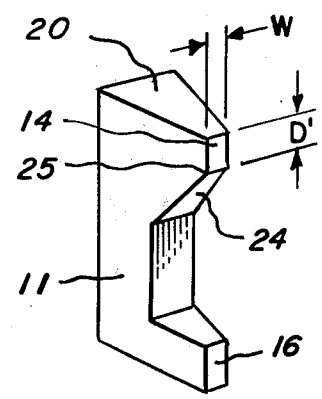
FIG. 3 is a perspective view of the C element forming part of the core of FIG. 1.

Turning first to FIG. 1, therein is shown a typical magnetic transducing core whose manufacture is the subject of this inventive process. The core comprises an I element 10 and a C element 11. The reference to element 10 as having an "I" shape is somewhat fanciful, but is preferred because it corresponds to the usual nomenclature applied to corresponding elements whose horizontal dimension (as oriented in FIG. 1) is significantly less than the vertical dimension. Both elements may conveniently be formed of a hard magnetic ceramic such as ferrite. C element 11 is bonded to I element 10 with a flux gap adjacent face 16 (shown edgewise in FIG. 1 and in true shape in FIG. 3) and between flux gap faces 17 and 14 (detail of FIG. 1). The flux gap shown in the detail of FIG. 1 performs the desired data transducing operations as the recording medium moves past the transducing surfaces 19 and 20 of I element 10 and C element 11 respectively. For aerodynamic purposes, lands 18 (FIG. 2) are cut into I element 10. The winding, not shown, is placed on C element 11.

To clearly explain the invention, it is necessary to precisely define the dimensions involved. The depth D of flux gap face 17 on I element 10 is the critical dimension, control of which is the object of this invention. C element flux gap face 14 of C element 11 has depth D′ greater than D, allowing flux gap face 17 depth D to define the effective depth of the gap itself. Flux gap 21 also has length L and width W, dimensions which must also be very accurately controlled, but whose control forms no part of this invention. In a typical transducing core now in wide use, D = 0.001 in., L = 25–50 $\mu$in., and W = 0.0025 in., all with appropriate dimensional tolerances of course. It is thus easy to see that accurate dimensioning of flux gap depth is indeed a precision undertaking.

Figure 2:
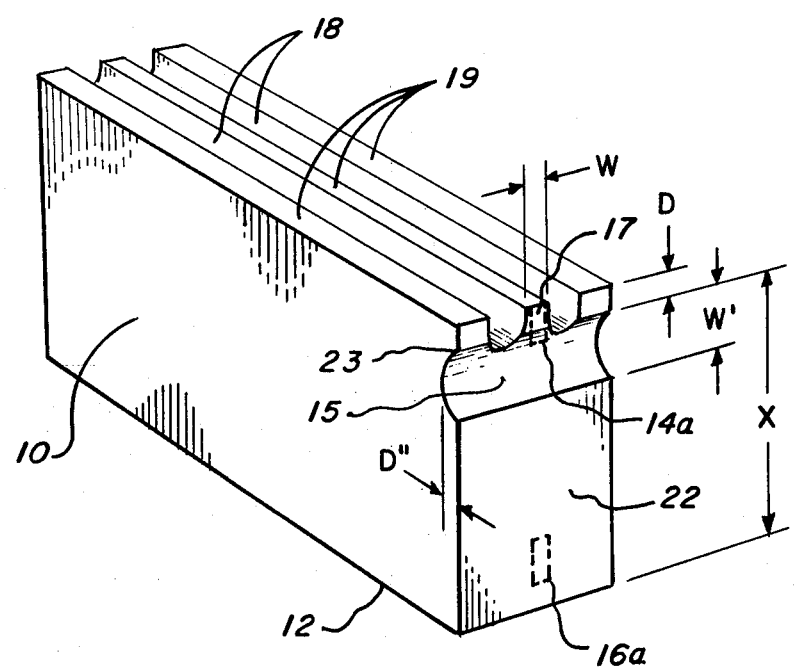
FIG. 2 is a perspective view of the I element forming part of the core of FIG. 1.

In the manufacture of this core, individual I elements 10 are prepared to approximately the shape shown in FIG. 2. Reference surface 12 is machined preferably parallel to and spaced apart from transducing surface 19. Next, notch 15 is machined into I element face 22, by its intersection therewith defining line 23 and forming flux gap face 17 with initial depth D either equal to or slightly greater than the final depth desired for the shallower of the two flux gap faces. Line 23 is located a distance X from reference surface 12. No particular value of X is necessary but the numeric value of X must be known. Either line 23 can be precisely located respective to surface 12, or line 23 can be relatively inaccurately located and its distance from surface 12 precisely measured or surface 12 machined to a precise distance from line 23. X must be known very accurately, since the accuracy of this dimension controls the accuracy of final depth D. The depth D″ of notch 15 has two constraints. On the one hand, it must be deep enough to prevent flux leakage between the material defining it and C element 11. On the other hand, it must not be so deep that the magnetic characteristics of the completed core are significantly affected. By selecting the angle $\theta$ of the tangent to the notch outline along line 23, as shown in the detail of FIG. 1, in the range of 20° to 50°, both of these problems can be avoided. A suitable all-purpose value for $\theta$ might be 40°. The width W′ of notch 15 can be conveniently selected several times the final depth D of face 17. Depth D″ of notch 15 can be conveniently in the range of one half to one third the notch 15 width W′. To avoid adversely affecting the magnetic characteristics of I element 10, it is important that notch 15 be smoothly contoured. It is immaterial whether or not notch 15 extends completely across face 22, since the notch characteristics are important only in the vicinity of flux gap faces 14 and 17. It is, however, usually more convenient to extend notch 15 entirely across face 22.

Turning next to C element 11, the practice of this invention requires that C element 11 be formed with initial depth D′ of flux gap face 14 exceeding that of dimension D (flux gap face 17) by a substantial amount. Then C element 11 is bonded to I element 10 so that flux gap faces 14 and 16 respectively occupy generally the areas indicated by dotted line boxes 14a and 16a in FIG. 2. As can be seen, this bonding operation must locate line 25 formed by the intersection of surface 24 and flux gap face 14 generally opposing and within notch 15. It is immaterial exactly where line 25 falls within notch 15, although for optimal transducing operation, it is usually desirable that surface 24 be kept sufficiently far from the opposing surface of notch 15 to prevent any appreciable flux leakage. Depth D′ places some constraint on the location of line 25 after bonding, since the plane containing transducing surface 20 must not pass closer to intersection line 23 than the desired flux gap face depth D. In general, it is desirable to form depth D′ of C element 11 prior to its bonding to I element 10 substantially greater than the final desired value of flux gap face depth D. This allows for the proper location of line 25 within notch 15 and sufficient excess depth to permit machining of transducing surface 19 and 20 to produce the final desired depth D. It thus is immaterial whether or not surface 20 precisely meets with surface 19. For convenience, C element 11 is dimensioned so as to not intersect the plane of surface 12 after assembly, allowing easier access thereto.

After C element 11 has been bonded to I element 10, the final step of this manufacturing operation must be done. This involves machining at least one of surfaces 19 and 20 so they are aligned with each other to form the final desired transducing surface geometry. This machining is done relative to reference surface 12 to create a distance between transducing surfaces 19 and 20 at the gap and reference surface 12 precisely equal to the predetermined dimension X plus the desired final gap depth D. By the simple geometry involved, one can easily see that desired final depth D will be accurately achieved. In certain cases one may require that transducing surfaces 19 and 20 define a smooth curve, rather than a plane. Use of surface 12 for reference allows this to be easily done.

It is immediately evident that the value of depth D prior to this final machining step cannot be less than the final desired value for D. Similarly, it can be seen that C element 11 must be bonded to I element 10 in such a fashion that the plane or other surface defined by transducing surface 20 prior to the final machining step is spaced from line 23 by an amount greater than the final value desired for depth D. However, experience shows that these constraints are easily achieved during mass production of these cores since only the two machining steps involving reference surface 12 and the formation of notch 15 in the first instance and the final grinding or otherwise machining of transducing surfaces 19 and 20 with reference to reference surface 12 need great precision. Machinery to perform these machining steps with the accuracy required are readily available and of great reliability. Therefore, this invention reduces the manufacturing process formerly requiring many high precision manufacturing steps into one requiring only two high precision steps, both of which involve relatively simple machining operations referenced to relatively large surfaces.

Having thus described the invention, what we claim is:

1. In a method for manufacturing a magnetic transducing core comprising C and I elements bonded together and forming a common surface for transducing, and between facing C and I element surfaces intersecting the transducing surface, forming a flux gap in the flux path formed by the elements, an improvement for forming the shallower of the two faces forming the flux gap with a depth equal to a first precisely predetermined distance, and comprising the steps of:

a. before bonding the elements together, i. machining on the I element a reference surface spaced apart from the transducing surface portion thereon, and ii. machining along the width dimension of the I element flux gap face a notch whose length is at least the width of the C element's flux gap face and whose line of intersection with the I element flux gap face nearer the I element transducing surface portion is spaced therefrom at least the first predetermined distance and is a second precise predetermined distance from the reference surface;

b. forming the C element with the depth of the flux gap face thereon greater than the first predetermined distance;

c. bonding the C element to the I element to form the flux gap, with one edge of the C element flux gap face opposing and within the notch; and d. machining the transducing surface until the distance between the transducing surface and the reference surface equals the sum of the first and second predetermined distances.

2. The method of claim 1, wherein the notch-forming step further includes forming the notch intersections with the flux gap face substantially parallel to each other and the transducing surface.

3. The method of claim 2, wherein the C element-forming step and the notch-forming step further comprise respectively forming the initial C element flux gap face depth, and the initial distance between the transducing surface and the nearer of the lines of intersection of the notch with the flux gap face, both greater than the first predetermined distance.

4. The method of claim 1, wherein the reference surface forming step further comprises machining the reference surface in the form of a flat plane substantially parallel to the final desired transducing surface plane.

5. The method of claim 1, wherein the notch-forming step further comprises the step of machining the notch to a depth approximately twice the flux gap length or greater.

6. The method of claim 1, wherein the notch-forming step further comprises the step of machining the notch with a cross-sectional shape whose tangent adjacent the line of intersection with the flux gap face nearer the transducing surface forms an angle of 20°–50° with the flux gap face.

7. The method of claim 6, wherein the reference surface-forming step further comprises machining the reference surface in the form of a flat plane substantially parallel to the final desired transducing surface plane.

8. The method of claim 7, wherein the notch-forming step further comprises the step of machining the notch to a depth approximately twice the flux gap length or greater.

* * * * *

REEXAMINATION CERTIFICATE (1636th)
United States Patent [19]
Hennenfent et al.

[11] B1 3,982,318
[45] Certificate Issued Feb. 4, 1992

[54] MAGNETIC TRANSDUCER HEAD CORE MANUFACTURING METHOD

[76] Inventors: Douglas J. Hennenfent, Minneapolis; Allan L. Holmstrand, Bloomington, both of Minn.

Reexamination Request:
No. 90/002,368, Jun. 17, 1991

Reexamination Certificate for:
Patent No.: 3,982,318
Issued: Sep. 28, 1976
Appl. No.: 653,578
Filed: Jan. 29, 1976

[51] Int. Cl.$^5$ ................................................ G11B 5/42
[52] U.S. Cl. ........................................ 29/603; 360/119
[58] Field of Search ........................... 29/603, 558; 360/119-121, 125-127

[56] References Cited

U.S. PATENT DOCUMENTS

| | | |
|---|---|---|
| 3,094,772 | 6/1963 | Duinker . |
| 3,302,268 | 7/0767 | Duinker . |
| 3,354,540 | 11/1967 | Duinker . |
| 3,395,451 | 8/1968 | Peloschek . |
| 3,402,463 | 9/1968 | Bos et al. . |
| 3,412,217 | 11/1968 | Bygones . |
| 3,435,155 | 3/1969 | Van Der Voo . |
| 3,502,821 | 3/1970 | Duinker . |
| 3,531,859 | 10/1970 | Van Der Voo . |
| 3,550,264 | 12/1970 | Bouwma . |
| 3,785,047 | 1/1974 | Ackley . |

FOREIGN PATENT DOCUMENTS 1524843 10/1972 Fed. Rep. of Germany .
40-1430 1/1965 Japan .

OTHER PUBLICATIONS

"Positioning Technology", published by Nikan Kogyo Shimbunsha, authored by Sugita, pp. 34—39.

Primary Examiner—Carl E. Hall

[57] ABSTRACT

A method for manufacturing a magnetic core for use in data transducing, characterized by having the depth of the shallower flux gap face precisely equal to a predetermined value. The method involves machining a notch in the flux gap face of one element at a precise distance from a reference surface before bonding of the two elements of the core together. The transducing surface can then be machined after assembly to an exact distance from the reference surface to automatically determine the desired flux gap depth.

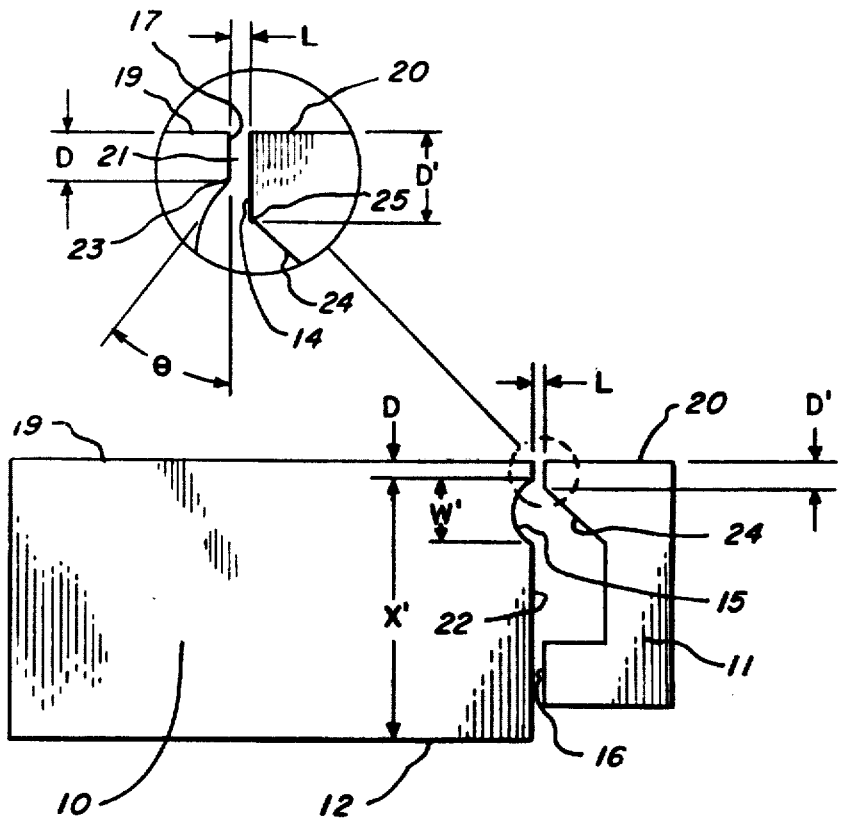

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *